United States Patent [19]

Coughlin et al.

[11] Patent Number: 5,508,330
[45] Date of Patent: Apr. 16, 1996

[54] BARRIER PROPERTY ENHANCEMENT OF FILMS AND MOLDED ARTICLES

[75] Inventors: Gregory R. Coughlin, Poughkeepsie; Robert A. Falk, New City, both of N.Y.

[73] Assignee: Ciba-Geigy Corporation, Tarrytown, N.Y.

[21] Appl. No.: 333,677

[22] Filed: Nov. 3, 1994

[51] Int. Cl.$^6$ ........................................... C08K 5/36
[52] U.S. Cl. ........................... 524/251; 524/323; 524/380; 524/393; 524/462; 524/463; 524/583
[58] Field of Search ............................ 428/421; 524/380, 524/393, 462, 583, 251, 323; 525/199, 240

[56] References Cited

U.S. PATENT DOCUMENTS

| | | | |
|---|---|---|---|
| 3,862,284 | 1/1975 | Dixon et al. | 264/83 |
| 3,899,563 | 8/1975 | Oxenrider et al. | 264/211 |
| 4,515,836 | 5/1985 | Cobbs, Jr. et al. | 427/425 |
| 4,764,405 | 8/1988 | Bauman et al. | 428/35 |
| 4,837,074 | 6/1989 | Rosinski et al. | 525/199 |
| 5,070,129 | 12/1991 | Bailey | 524/462 |
| 5,143,963 | 9/1992 | Sterling et al. | 524/462 |
| 5,188,873 | 2/1993 | Delannoy | 525/199 |
| 5,399,400 | 3/1995 | Nile et al. | 525/199 |

FOREIGN PATENT DOCUMENTS 2069870  9/1981  United Kingdom.

OTHER PUBLICATIONS

D. Thompson, et al. "New Fluorochemicals for Protective Clothing"; pp. 345–364 (1990).

*Primary Examiner*—Mark D. Sweet
*Attorney, Agent, or Firm*—Michele A. Kovaleski

[57] ABSTRACT

An improvement in barrier properties of films and molded articles containing an organic polymer is achieved by incorporation therein of fluorochemicals, fluoropolymers or mixtures thereof, wherein said fluorochemicals or fluoropolymers contain greater than 40% fluorine by weight and exhibit less than 20% weight loss at 165° C., as measured by thermogravimetric analysis at 20° C. per minute in air. The films and molded articles in accordance with the present invention exhibit improved vapor and chemical barrier properties.

15 Claims, No Drawings

BARRIER PROPERTY ENHANCEMENT OF FILMS AND MOLDED ARTICLES

BACKGROUND OF THE INVENTION

Barrier polymers are thoroughly discussed in "Encyclopedia of Science and Technology", 2nd Edition, Vol. 2 (Kirk-Othmer), pp. 176–192; 4th Edition, Vol. 3, pp. 931–962.

While plastics have found wide spread utility for containment of food and non-food products, they have often been found to be lacking in their barrier characteristics towards gases such as oxygen and carbon dioxide, or solvents such as gasoline, toluene, methylene chloride, or moisture.

The need for barrier properties towards oxygen, carbon dioxide, etc., is felt most importantly for the packaging of food. Oxidation of food due to the ambient oxygen can cause browning, rancidity, off-taste and off-smell, mold formation, etc., sometimes posing serious health hazards. A less serious yet commercially important problem is the loss of carbon dioxide from carbonated beverages, causing the beverage to go "flat".

While it is desirable to package a number of products, such as coffee or fruit juices in unbreakable, light weight or transparent plastic containers, such containers often absorb the essential oils and aroma components out of the product, resulting in an off-taste or smell, called distortion. The perfume, cologne, and cosmetic industry has also long recognized the same problem with respect to their packaging needs.

In non-food applications, there is a need for containment for fuels, gasoline additives, solvent-based cleaners, non-polar solvents, etc. and other active ingredients in polymer, particularly polyolefin, containers. The problem is further compounded by the problem of migration of unreacted monomers, low molecular weight polymers and other processing aids and additives from the container into the product; i.e., leaching. Such problems are particularly acute for containment of fuels in gasoline tanks and agricultural tanks, for protection of wire cables, and for waste containment with geomembranes.

Patented processes are known whereby the inner surface of plastic containers are modified by sulfonation or fluorination during or after the blow molding of the container. This treatment changes the surface characteristics of the polyolefin used to make the container so that the solvent is kept from wetting the inner surface. This prevents absorption and transmission of the solvent vapor through the container wall. The polyolefin is thus a barrier to either nonpolar solvents or aqueous solutions of active ingredient. Such containers can be used for herbicides, pesticides, gasoline, and other products that would normally penetrate polyolefin and would frequently be packaged in glass or metal.

For example, U.S. Pat. No. 3,862,284 discloses a process whereby the barrier properties of blow molded thermoplastic articles are improved by employing a blowing gas containing about 0.01 to about 20% by volume fluorine during the expansion of the thermoplastic article.

U.S. Pat. No. 4,515,836 discloses a process for providing a substrate such as poly(ethylene terephalate) container with a gas barrier coating of a copolymer of vinylidene chloride. The outside surface of the container is impacted with a stream of a stabilized aqueous polymer dispersion with sufficient force to cause selective destabilization of the dispersion at the surface interface to form a gel layer containing the polymer in the continuous phase. This gel layer serves as an adhesive layer for an overlaying layer of the aqueous polymer dispersion as a continuous uniform coating.

British Patent No. 2,069,870 B discloses a process for improving the barrier properties of polymeric containers, by treating at least one surface of the container with sulphur trioxide, followed by washing with an aqueous medium and subsequently applying a layer of a dispersion of a melamine-formaldehyde or urea-formaldehyde condensation product. The dispersion layer is then cured to form the final product.

Chemical vapor resistance and barrier property enhancement have been traditionally achieved commercially by surface treatment or coextrusion technologies. These approaches are further taught in U.S. Pat. Nos. 4,764,405, Hitherto, approaches such as surface treatment or coextrusion have in some circumstances provided excellent improvements for various substrates.

Barrier polymers are often used in combination with other polymers or substances. The combinations may result in a layered structure either by coextrusion, lamination, or coating. The combinations may be blends that are either miscible or immiscible. In each case, the blend seeks to combine the best properties of two or more different materials to enhance the value of a final structure. An example of an immiscible blend is an inert filler in a polymer matrix.

Fluorochemical additives have demonstrated the unique ability to modify the surface properties of polymers and act as processing aids. Fluorochemicals inherently retain these unique migrating properties while maintaining the high molecular weight necessary to minimize volatility.

It has now been found that a variety of polymer substrates with increased chemical and vapor resistance and enhanced barrier properties are readily prepared by melt compounding the subject polymer fluoroelastomers, fluorochemicals or mixtures thereof, wherein said fluorochemical or fluoropolymer contains greater than 40% fluorine by weight and exhibits less than 20% weight loss at 165° C., as measured by thermogravimetric analysis at 20° C./minute in air. Said fluorochemicals or fluoropolymers can also act as processing aids or mold release agents and enhance other properties such as environmental crack resistance and long term light and heat stability.

The instant invention is particularly useful to improve the chemical and vapor resistance and barrier properties of pellicles, films, membranes, molded articles, containers and the like. In particular, it is useful in the production of gasoline tanks, agricultural tanks, wire cables and geomembranes.

The use of fluorochemicals for protective clothing made from polypropylene nonwoven fiber is described in a paper by D. R. Thompson et al., entitled "New Fluorochemicals for Protective Clothing" from Book-Pap.-Int. Nonwoven Fabric Conf. (1990) pp. 345–364.

OBJECTS OF THE INVENTION

One object of the present invention is to provide novel polymeric films and molded articles, having enhanced barrier properties, by incorporating therein an effective amount of a fluorochemical or fluoropolymer.

Another object of the invention is to provide a process for achieving the above objective.

Still other objects will become apparent from the discussion set forth hereinbelow.

DETAILED DISCLOSURE

This invention pertains to films and molded articles into which fluorochemicals are incorporated in order to improve chemical resistance and barrier properties. The films and molded articles include organic polymers such as plastic and rubber. The present invention improves the properties of the substrate compositions so that the passage of a wide variety of both polar and nonpolar liquids and vapors into or out of substrate is prevented.

More particularly, the present invention pertains to a film or molded article, having enhanced barrier properties, which film or molded article comprises (a) an organic polymer, and (b) an effective amount, sufficient to provide enhanced barrier properties to said organic polymer, of a fluorochemical, fluoropolymer or mixture thereof wherein said fluorochemical or fluoropolymer contains greater than 40% fluorine by weight and exhibits less than 20% weight loss at 165° C., as measured by thermogravimetric analysis (TGA) at 20° C./minute in air.

Preferably, such fluorochemical or fluoropolymer contains a terminally fluorinated chain of 6 to 16 carbons. Any such perfluorinated compounds or polymers can be used so long as they are inert relevant to the substrate and do not contain sufficient hydrophilic or oleophilic functionality to render them extractable by water or oleophilic solvent. Perfluorinated materials are fundamentally hydrophobic and oleophobic in nature.

More particularly, the invention pertains to a film or molded article containing a compound of formula I, II, III or IV $$R_f-E-X_1 \quad (I)$$

$$R_f-E-R_f \quad (II)$$

$$R_f-E-S-S-E-R_f \quad (III)$$

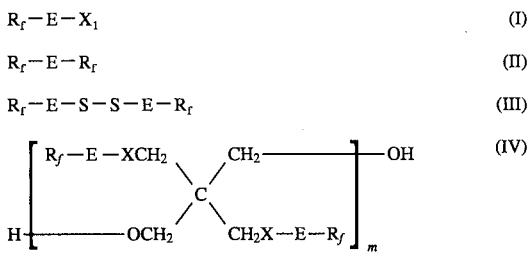

(IV)

or is a perfluoroalkylethyl alkanoate; a perfluoroalkylethyl citrate; a poly-perfluoroalkyl substituted alcohol, acid or derivatives thereof; or a perfluoroalkyl sulfide, sulfone, polysulfone or polysulfide diol,
wherein $X_1$ is hydrogen, halogen or hydroxyl:

E is a branched or straight chain alkylene of 1 to 10 carbon atoms or said alkylene interrupted by one to three groups selected from the group consisting of —NR—, —O—, —S—, —SO$_2$—, —COO—, —OOC—, —CONR—, —NRCO—, —SO$_2$NR—, —NRSO$_2$—, or terminated at the $R_f$ end with —CONR— or —SO$_2$NR—, where $R_f$ is attached to the carbon or sulfur atom, and where R is independently hydrogen, alkyl of 1 to 6 carbon atoms or hydroxyalkyl of 2 to 6 carbon atoms;

$R_f$ is a straight or branched chain perfluoroalkyl of 1 to 12 carbon atoms, perfluoroalkyl of 2 to 6 carbon atoms substituted by perfluoralkoxy of 2 to 6 carbon atoms, or $R_f$ is an oligo(hexafluoropropene oxide) terminal group;

X is S, SO$_2$ or —NR—, where R is defined as above; and m is 1, 2 or 3.

The poly-perfluoroalkyl substituted alcohols, acids and derivatives thereof as well as a process for making them are described in copending U.S. application Ser. No. 08/270,083, filed on Jul. 1, 1994. The perfluoroalkyl sulfides, sulfones, polysulfones and polysulfide diols and a process for preparing said compounds are described in copending U.S. application Ser. No. 08/270,067, filed on Jul. 1, 1994. Other fluorochemicals are well known in the an and are described, for example, in U.S. Pat. Nos. 4,898,981 or 4,029,585.

Particularly preferred among the fluorochemicals are $R_fCH=CH_2$, $R_fF$, $R_f(CH_2)_nR_f$, $(R_fCH_2CH_2S)_2$, $R_fCH_2CH_2OH$, $R_fSO_2NHR$, $R_fSO_2NRCH_2CH_2OH$, $R_fCH_2CH_2SO_2NHR$, $(R_fCH_2CH_2SCH_2)_2C(CH_2OH)_2$, tris( 1,1,2,2-tetrahydro-$C_6$–$C_{18}$-perfluoroalkylethyl) citrate, 2,2-bis[[($C_6$–$C_{18}$-perfluoroalkyl-2-propenyl)oxy]methyl]-1-butanol and 3-[$C_6$–$C_{18}$-perfluoroalkyl-2-propenyl)oxy]-2,2-bis-[[$C_6$–C18-perfluoroalkyl-2 -propenyl)oxy]methyl]-1-propanol. Still more preferred is $(R_fCH_2CH_2S)_2$, $(R_fCH_2CH_2SCH_2)_2C(CH_2OH)_2$, tris( 1,1,2,2-tetrahydro-$C_6$–$C_{18}$-perfluoroalkylethyl) citrate, 2,2-bis[[($C_6$–$C_{18}$-perfluoroalkyl-2-propenyl)oxy]methyl]-1-butanol and 3-[$C_6$–$C_{18}$-perfluoroalkyl-2-propenyl)oxy]-2,2-bis-[ [$C_6$–$C_{18}$-perfluoroalkyl-2 -propenyl)oxy]methyl]-1-propanol. Even more preferred is $(R_fCH_2CH_2S)_2$ and $(R_fCH_2CH_2SCH_2)_2C(CH_2OH)_2$, with the most preferred being the latter fluorochemical.

Particularly preferred among the fluoropolymers are polytetrafluoroethylene, poly(chlorotrifluoroethylene), poly(chlorotrifluoroethylene-co-vinylidene fluoride), poly(ethylene-co-chlorotrifluoroethylene), poly(vinyl fluoride), poly(hexafluoroisobutylene-co-vinylidene fluoride) and fluorinated polyethylene.

Fluoropolymers are commercial products and are well known in the art. They are described, for example, in Preparation, Properties, and Industrial Applications of Organofluorine Compounds by Banks, R. E., John Wiley (1992) at page 202.

It is understood that the $R_f$ group usually represents a mixture of perfluoroalkyl moieties. When the $R_f$ group is identified as having a certain number of carbon atoms, said $R_f$ group also usually concomitantly contains a small fraction of perfluoroalkyl groups with a lower number of carbon atoms and a small fraction of perfluoroalkyl groups with a higher number of carbon atoms. Commonly the perfluoroalkyl moiety is a mixture of $C_4F_9$—, $C_6F_{13}$—, $C_8F_{17}$—, $C_{10}F_{21}$—, $C_{12}F_{25}$— and $C_{14}F_{29}$—.

Preferably the instant fluorochemicals, fluoropolymers or mixtures thereof are those where $R_f$ is perfluoroalkyl of 6 to 12 carbon atoms or perfluoroalkyl of 2 to 6 carbon atoms substituted by perfluoroalkoxy of 2 to 6 carbon atoms, E is alkylene of 2 to 6 carbon atoms, —CONHCH$_2$CH$_2$—, —CH$_2$CH$_2$N(CH$_3$)CH$_2$CH$_2$—, —CH$_2$CH$_2$SO$_2$NHCH$_2$CH$_2$— or —SO$_2$NHCH$_2$CH$_2$.

The instant invention relates to a process for improving the barrier properties of films and molded articles containing an organic polymer, which process comprises the steps of (a) incorporating into the organic polymer an effective amount, sufficient to provide enhanced barrier properties to said organic polymer, of a fluorochemical, fluoropolymer or mixture thereof, wherein said fluorochemical or fluoropolymer contains greater than 40% fluorine by weight and exhibits less than 20% weight loss at 165° C., as measured by thermogravimetric analysis (TGA) at 20° C./minute in air; and (b) subsequently producing a film or molded article therefrom.

The organic material of component (a) is preferably a synthetic polymer, most preferably a polyolefin, particularly polypropylene.

Substrates in which the compounds of this invention are particularly useful are polyolefins such as polypropylene and polyethylene; polystyrene, including especially impact polystyrene; ABS resin; elastomers such as e.g. butadiene rubber, EPM, EPDM, SBR and nitrile rubber.

The instant invention also pertains to films and molded articles which additionally contain other additives such as an antioxidant, a hindered amine stabilizer, a sulfur-containing synergist, a metal deactivator, a UV absorber, other light stabilizers or mixtures thereof. Lists of appropriate additive compounds are given below.

In general polymers which can be stabilized include

1. Polymers of monoolefins and diolefins, for example polyethylene (which optionally can be crosslinked), polypropylene, polyisobutylene, polybutene-1, polymethylpentene-1, polyisoprene or polybutadiene, as well as polymers of cycloolefins, for instance of cyclopentene or norbornene.

2. Mixtures of the polymers mentioned under 1), for example mixtures of polypropylene with polyisobutylene.

3. Copolymers of monoolefins and diolefins with each other or with other vinyl monomers, such as, for example, ethylene/propylene, propylene/butene-1, propylene/isobutylene, ethylene/butene-1, propylene/butadiene, isobutylene/isoprene, ethylene/alkyl acrylates, ethylene/alkyl methacrylates, ethylene/vinyl acetate or ethylene/acrylic acid copolymers and their salts (ionomers) and terpolymers of ethylene with propylene and a diene, such as hexadiene, dicyclopentadiene or ethylidene-norbornene.

4. Polystyrene, poly-(p-methylstyrene).

5. Copolymers of styrene or methylstyrene with dienes or acrylic derivatives, such as, for example, styrene/butadiene, styrene/acrylonitrile, styrene/ethyl methacrylate, styrene/butadiene/ethyl acrylate, styrene/acrylonitrile/methyl acrylate; mixtures of high impact strength from styrene copolymers and another polymer, such as, for example, from a polyacrylate, a diene polymer or an ethylene/propylene/diene terpolymer; and block polymers of styrene, such as, for example, styrene/butadiene/styrene, styrene/isoprene/styrene, styrene/ethylene/butylene/styrene or styrene/ethylene/propylene/styrene.

6. Graff copolymers of styrene, such as, for example, styrene on polybutadiene, styrene and acrylonitrile on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed under 5), for instance the copolymer mixtures known as ABS-, MBS-, ASA- or AES-polymers.

7. Halogen-containing polymers, such as polychloroprene, chlorinated rubbers, chlorinated or sulfochlorinated polyethylene, epichlorohydrin homo- and copolymers, polymers from halogen-containing vinyl compounds, as for example, polyvinylchloride, polyvinylidene chloride, polyvinyl fluoride, polyvinylidene fluoride, as well as copolymers thereof, as for example, vinyl chloride/vinylidene chloride, vinyl chloride/vinyl acetate, vinylidene chloride/vinyl acetate copolymers, or vinyl fluoride/vinyl ether copolymers.

8. Polymers which are derived from α,β-unsaturated acids and derivatives thereof, such as polyacrylates and polymethacrylates, polyacrylamide and polyacrylonitrile.

9. Copolymers from the monomers mentioned under 8) with each other or with other unsaturated monomers, such as, for instance, acrylonitrile/butadiene, acrylonitrile/alkyl acrylate, acrylonitrile/alkoxyalkyl acrylate or acrylonitrile/vinyl halogenide copolymers or acrylonitrile/alkyl methacrylate/butadiene terpolymers.

10. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinylbutyral, polyallyl phthalate or polyallylmelamine.

11. Homopolymers and copolymers of cyclic ethers, such as polyalkylene glycols, polyethylene oxide, polypropylene oxide or copolymers thereof with bis-glycidyl ethers.

12. Polyacetals, such as polyoxymethylene and those polyoxymethylenes which contain ethylene oxide as comonomer.

13. Polyphenylene oxides and sulfides, and mixtures of polyphenylene oxides with polystyrene.

14. Polyurethanes which are derived from polyethers, polyesters or polybutadienes with terminal hydroxyl groups on the one side and aliphatic or aromatic polyisocyanates on the other side, as well as precursors thereof (polyisocyanates, polyols or prepolymers).

15. Polyamides and copolyamides which are derived from diamines and dicarboxylic acids and/or from aminocarboxylic acids or the corresponding lactams, such as polyamide 4, polyamide 6, polyamide 6/6, polyamide 6/10, polyamide 11, polyamide 12, poly-2,4,4-trimethylhexamethylene terephthalamide, poly-p-phenylene terephthalamide or poly-m-phenylene isophthalamide, as well as copolymers thereof with polyethers, such as for instance with polyethylene glycol, polypropylene glycol or polytetramethylene glycols.

16. Polyureas, polyimides and polyamide-imides.

17. Polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-[2,2-(4-hydroxyphenyl)-propane] terephthalate and polyhydroxybenzoates as well as block-copolyetheresters derived from polyethers having hydroxyl end groups.

18. Polycarbonates.

19. Polysulfones, polyethersulfones and polyetherketones.

20. Crosslinked polymers which are derived from aldehydes on the one hand and phenols, ureas and melamines on the other hand, such as phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low flammability.

23. Thermosetting acrylic resins, derived from substituted acrylic esters, such as epoxy-acrylates, urethane-acrylates or polyester acrylates.

24. Alkyd resins, polyester resins or acrylate resins in admixture with melamine resins, urea resins, polyisocyanates or epoxide resins as crosslinking agents.

25. Crosslinked epoxide resins which are derived from polyepoxides, for example from bis-glycidyl ethers or from cycloaliphatic diepoxides.
26. Natural polymers, such as cellulose, rubber, gelatin and derivatives thereof which are chemically modified in a polymer homologous manner, such as cellulose acetates, cellulose propionates and cellulose butyrates, or the cellulose ethers, such as methyl cellulose.
27. Mixtures of polymers as mentioned above, for example PP/EPDM, Polyamide 6/EPDM or ABS, PVC/EVA, PVC/ABS, PVC/MBS, PC/ABS, PBTP/ABS.
28. Aqueous emulsions of natural or synthetic rubber, e.g. natural latex or latices of carboxylated styrene/butadiene copolymers.
29. Polysiloxanes such as the soft, hydrophilic polysiloxanes described, for example, in U.S. Pat. No. 4,259,467; and the hard polyorganosiloxanes described, for example, in U.S. Pat. No. 4,355,147.
30. Polyketimines in combination with unsaturated acrylic polyacetoacetate resins or with unsaturated acrylic resins. The unsaturated acrylic resins include the urethane acrylates, polyether acrylates, vinyl or acryl copolymers with pendant unsaturated groups and the acrylated melamines. The polyketimines are prepared from polyamines and ketones in the presence of an acid catalyst.
31. Radiation curable compositions containing ethylenically unsaturated monomers or oligomers and a polyunsaturated aliphatic oligomer.
32. Epoxymelamine resins such as light-stable epoxy resins crosslinked by an epoxy functional coetherified high solids melamine resin such as LSE-4103 (Monsanto).

In general, the compounds of the present invention are employed in from about 0.01 to about 5% by weight of the stabilized composition, although this will vary with the particular substrate and application. An advantageous range is from about 0.5 to about 2%, and especially 0.1 to about 1%.

The stabilizers of the instant invention may readily be incorporated into the organic polymers by conventional techniques, at any convenient stage prior to the manufacture of films or shaped articles therefrom. For example, the stabilizer may be mixed with the polymer in dry powder form, or a suspension or emulsion of the stabilizer may be mixed with a solution, suspension, or emulsion of the polymer. The resulting stabilized polymer compositions of the invention may optionally also contain from about 0.01 to about 5%, preferably from about 0.025 to about 2%, and especially from about 0.1 to about 1% by weight of various conventional additives, such as the materials listed below, or mixtures thereof. The instant films or molded articles may be produced by any customary processing technique, such as, but not limited to, extrusion, blow molding, compression molding, and the like.

1. Antioxidants 1.1. Alkylated monophenols, for example, 2,6-di-tert-butyl-4-methylphenol
2-tert-butyl-4,6-dimethylphenol
2,6-di-tert-butyl-4-ethylphenol
2,6-di-tert-butyl-4-n-butylphenol
2,6-di-tert-butyl-4-i-butylphenol
2,6-di-cyclopentyl-4-methylphenol
2-($\alpha$-methylcyclohexyl)-4,6-dimethylphenol
2,6-di-octadecyl-4-methylphenol
2,4,6-tri-cyclohexylphenol
2,6-di-tert-butyl-4-methoxymethylphenol 1.2. Alkylated hydroquinones, for example, 2,6-di-ten-butyl-4-methoxyphenol
2,5-di-tert-butyl-hydroquinone
2,5-di-tert-amyl-hydroquinone
2,6-diphenyl-4-octadecyloxyphenol 1.3. Hydroxylated thiodiphenyl ether, for example, 2,2'-thio-bis-(6-tert-butyl-4-methylphenol)
2,2'-thio-bis-(4-octylphenol)
4,4'-thio-bis-(6-tert-butyl-3-methylphenol)
4,4'-thio-bis-(6-tert-butyl-2-methylphenol)

1.4. Alkylidene-bisphenols, for example, 2,2'-methylene-bis-(6-tert-buty 1-4-methylphenol)
2,2'-methylene-bis-(6-tert-butyl-4-ethylphenol)
2,2'-methylene-bis-[4-methyl-6-($\alpha$-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-($\alpha$-methylbenzyl)-4-nonylphenol]
2,2'-methylene-bis-[6-($\alpha,\alpha$-dimethylbenzyl)-4-nonylphenol]
2,2'-methylene-bis-(4,6-di-tert-butylphenol)
2,2'-ethylidene-bis-(4,6-di-tert-butylphenol)
2,2'-ethylidene-bis-(6-tert-butyl-4-isobutylphenol)
4,4'-methylene-bis-(2,6-di-tert-butylphenol)
4,4'-methylene-bis-(6-tert-butyl-2-methylphenol)
1,1-bis-(5-tert-butyl-4-hydroxy-2-methylphenyl)-butane
2,6-di-(3-tert-butyl-5-methyl-2-hydroxybenzyl)-4-methylphenol
1,1,3-tris-(5-tert-butyl-4-hydroxy-2-methyl phenyl)-butane
1,1-bis-(5-tert-butyl-4-hydroxy-2-methylphenyl)-3-n-dodecylmercaptobutane
ethyleneglycol bis-[3,3-bis-(3'-tert-butyl-4'-hydroxyphenyl)-butyrate]
di-(3-tert-butyl-4-hydroxy- 5-methylphenyl)-dicyclopentadiene
di-[2-(3'-tert-butyl-2'-hydroxy-5'-methyl-benzyl)- 6-tert-butyl-4-methylphenyl]terephthalate.

1.5. Benzyl compounds, for example, 1,3,5-tri-(3,5-di-tert-butyl-4-hydroxybenzyl)-2,4,6-trimethylbenzene
di-(3,5-di-tert-butyl-4-hydroxybenzyl) sulfide
3,5-di-tert-butyl-4-hydroxybenzyl-mercapto-acetic acid isooctyl ester
bis-(4-tert-butyl-3-hydroxy-2,6-dimethylbenzyl)dithiol terephthalate
1,3,5-tris-(3,5-di-tert-butyl-4-hydroxybenzyl) isocyanurate
1,3,5-tris-(4-tert-butyl-3-hydroxy-2,6-dimethylbenzyl) isocyanurate
3,5-di-tert-butyl-4-hydroxybenzyl-phosphoric acid dioctadecyl ester
3,5-di-tert-butyl-4-hydroxybenzyl-phosphoric acid monoethyl ester, calcium-salt 1.6. Acylaminophenols, for example, 4-hydroxy-lauric acid anilide 4-hydroxy-stearic acid anilide 2,4-bis-octylmercapto-6-(3,5-ten-butyl-4-hydroxyanilino)-s-triazine octyl-N-(3,5-di-ten-butyl-4-hydroxyphenyl)-carbamate 1.7. Esters of β-(3,5-di-tert-butyl-4-hydroxyphenyl)-propionic acid with monohydric or polyhydric alcohols, for example,

| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |

1.8. Esters of β-(5-tert-butyl-4-hydroxy-3-methylphenyl)-propionic acid with monohydric or polyhydric alcohols, for example,

| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |

1.9. Amides of β-(3,5di-tert-butyl-4-hydroxyphenyl)-propionic acid for example,

N,N'-di-(3,5-di-tert-butyl-4-hydroxyphenylpropionyl)-hexamethylethylenediamine

N,N'-di-(3,5-di-tert-butyl-4-hydroxyphenylpropionyl)-trimethylenediamine

N,N'-di-(3,5-di-tert-butyl-4-hydroxyphenylpropionyl)-hydrazine 1.10 Diarylamines, for example, diphenylamine, N-phenyl-1-naphthylamine, N-(4-tert-octylphenyl)-1-naphthylamine, 4,4'-di-tert-octyl-diphenylamine, reaction product of N-phenylbenzylamine and 2,4,4-trimethylpentene, reaction product of diphenylamine and 2,4,4-trimethylpentene, reaction product of N-phenyl-1-naphthylamine and 2,4,4-trimethylpentene.

2. UV absorbers and light stabilizers 2.1.2-(2'-Hydroxyphenyl)-benzotriazoles, for example, the 5'-methyl-, 3',5'-di-tert-butyl-, 5'-tert-butyl-,5'-(1,1,3,3-tetramethylbutyl)-, 5-chloro-3',5'-di-tert-butyl-, 5-chloro-3'-tert-butyl-5'-methyl-, 3'-sec-butyl-5'-tenbutyl-,4'-octoxy, 3',5'-di-tert-amyl-, 3',5'-bis-(α,α-dimethylbenzyl), 3'-tert-butyl-5'-(2-(omega-hydroxy-octa-(ethyleneoxy)carbonyl-ethyl)-, 3'-dodecyl-5'-methyl-, and 3'-tert-butyl-5'-(2-octyloxycarbonyl)ethyl-, and dodecylated-5'-methyl derivatives.

2.2. 2-Hydroxy-benzophenones, for example, the 4-hydroxy-, 4-methoxy-, 4-octoxy-, 4-decyloxy-, 4-dodecyloxy-, 4-benzyloxy-, 4,2',4'-trihydroxy- and 2'-hydroxy-4,4'-dimethoxy derivatives.

2.3. Esters of optionally substituted benzoic acids for example, phenyl salicylate, 4-tert-butylphenyl salicylate, octylphenyl salicylate, dibenzoylresorcinol, bis-(4-tert-butylbenzoyl)-resorcinol, benzoylresorcinol, 3,5-di-tert-butyl-4-hyclroxybenzoic acid 2,4-di-tert-butylphenyl ester and 3,5-di-tert-butyl-4-hydroxybenzoic acid hexadecyl ester.

2.4. Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.

2.5. Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazole, optionally with additional ligands.

2.6. Sterically, hindered amines, for example bis-(2,2,6,6-tetramethylpiperidyl) sebacate, bis-(1,2,2,6,6-pentamethylpiperidyl) sebacate, n-butyl-3,5-di-tert.butyl-4-hydroxybenzyl malonic acid bis-(1,2,2,6,6-pentanemethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylenediamine and 4-tert-octyl-amino-2,6-dichloro-s-triazine, tris-(2,2,6,6-tetramethylpiperidyl)-nitrilotriacetate, tetrakis-(2,2,6,6-tetramethyl-4-piperidyl) 1,2,3,4-butanetetracarboxylate, 1,1'(1,2-ethanediyl)-bis-( 3,3,5-tetramethylpiperazinone), bis(1-octyloxy-2,2,6,6-tetramethylpiperidin-4-yl) sebacate.

2.7. Oxalic acid diamides, for example, 4,4'-di-octyloxy-oxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxa N,N'-bis (3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy- as well as of o- and p-ethoxy-disubstituted oxanilides.

2.8. Hydroxyphenyl-s-triazines, for example 2,6-bis-(2,4-dimethylphenyl)-4-(2-hydroxy-4-octyloxyphenyl)-s-triazine; 2,6-bis-(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis[2-hydroxy-4-(2-hydroxyethoxy)phenyl] -6-(4-chlorophenyl)-s-triazine; 2,4-bis[ 2-hydroxy-4-(2-hydroxy-4-(2-hydroxyethoxy)phenyl] -6-(2,4-dimethylphenyl)-s-triazine; 2,4-bis[ 2-hydroxy-4-(2-hydroxyethoxy)phenyl] -6-(4-bromophenyl)-s-triazine; 2,4-bis[2-hydroxy-4-(2-acetoxyethoxy)phenyl]-6 -(4-chlorophenyl)-s-triazine, 2,4-bis(2,4-dihydroxyphenyl)-6-(2,4-dimethylphenyl)-s-triazine.

3. Metal deactivators, for example, N,N'-diphenyloxalic acid diamide, N-salicyloyl-N'-salicyloylhydrazine, N,N'-bis-salicyloylhydrazine, N,N'-bis-(3,5-di-ten-butyl-4-hydroxy-phenylpropionyl)-hydrazine, 3-salicyloylamino-1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl) phosphite, trilauryl phosphite, trioctadecyl phosphite, di-stearyl-pentaerythritol diphosphite, tris-(2,4-di-tert-butylphenyl) phosphite, di-isodecylpentaerythritol diphosphite, di-(2,4-di-tert-butylphenyl)pentaerythritol diphosphite, tristearyl-sorbitol triphosphite, tetrakis-(2,4-di-tert-butylphenyl) 4,4'-diphenylylenediphosphonite.

5. Compounds which destroy peroxide, for example, esters of β-thiodipropionic acid, for example the lauryl, stearyl, myristyl or tridecyl esters, mercapto-benzimidazole or the zinc salt of 2-mercaptobenzimidazole, zinc dibutyl-dithiocarbamate, dioctadecyl disulfide, pentaerythritol tetrakis-(β-dodecylmercapto)-propionate.

6. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhychoxylamine, N,N -dioctadecylhydroxylamine, N -hexadecyl- N-octadecylhydroxylamine, N-heptadecyl-N-octadecylhydroxylamine, N,N-dialkylhydroxylamine derived from hydrogenated tallow amine.

7. Nitrones, for example, N-benzyl-alpha-phenyl nitrone, N-ethyl-alpha-methyl nitrone, N-octyl-alpha-heptyl nitrone, N-lauryl-alpha-undecyl nittone, N-tetradecyl-alpha-tridecyl nitrone, N-hexadecyl-alpha-pentadecyl nitrone, N-octadecyl-alpha-heptadecylnitrone, N-hexadecyl-alpha-heptadecyl nittone, N-octadecyl-alpha-pentadecyl nitrone, N-heptadecyl-alpha-heptadecyl nitrone, N-octadecyl-alpha-hexadecyl nitrone, nitrone derived from N,N-dialkylhydroxylamine derived from hydrogenated tallow amine.

8. Polyamide stabilizers, for example copper salts in combination with iodides and/or phosphorus compounds and salts of divalent manganese.

9. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

10. Nucleating agents, for example, 4-tert-butyl-benzoic acid, adipic acid, diphenylacetic acid.

11. Fillers and reinforcing agents, for example, calcium carbonate, silicates, glass fibers, asbestos, talc, kaolin, mica, barium sulfate, metal oxides and hydroxides, carbon black, graphite.

12. Other additives, for example, plasticizers, lubricants, emulsifiers, pigments, optical brighteners, flameproofing agents, anti-static agents, blowing agents and thiosynergists such as dilauryl thiodipropionate or distearyl thiodipropionate.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl- 4-hydroxyhydrocinnammate), di-n-octadecyl 3,5-di-tert-butyl-4-hydroxybenzylphosphonate, 1,3,5-tris(3, 5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4 -hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5 -tris(2,6-dimethyl-4-tert-butyl-3-hydroxybenzyl)isocynurate, 1,1,3,-tris(2-methyl-4-hydroxy5 -tert-butylphenyl)butane, 1,3,5-tris[2-(3,5-di-tert-butyl-4-hydroxyhydrocinnamoyloxy)ethyl]isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di-(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis-[3,3-di(3-tert-butyl-4 -hydroxyphenyl)butyrate], octyl 3,5-di-tert-butyl-4-hydroxybenzyl-mercaptoacetate, bis(3,5-di-tert-butyl-4-hydroxyhydrocinnamoyl)hydrazide, and N,N'-bis[2-(3,5-di-tert-butyl-4-hydroxyhydrocinnamoyloxy)-ethyl]-oxamide.

A most preferred phenolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris( 3,5-di-tert-butyl-4-hydroxybenzyl)benzene, 1,3,5-tris(3,5-di-tert-butyl-4hydroxybenzyl)isocyanurate, 2,6-di-tert-butyl-p-cresol or 2,2'-ethylidene-bis(4,6-di-tert-butylphenol).

The hindered amine compound of particular interest is selected from the group consisting of bis(2,2,6,6-tetramethylpiperidin-4-yl)sebacate, bis(1,2,2,6,6-pentamethyl-piperidin-4-yl) sebacate, di(1,2,2,6,6-pentamethylpiperidin-4-yl) (3,5-di-tert-butyl-4-hydroxybenzyl)butylmalonate, 4-benzoyl-2,2,6,6-tetramethylpiperidine, 4-stearyloxy-2,2,6,6-tetramethylpiperidine, 3-n-octyl-7,7,9,9-tetramethyl- 1,3,8-triaza-spiro[ 4.5]decane-2,4-dione, tris(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21 -oxodispiro[5.1.11.2] heneicosane, polycondensation product of 2,4-dichloro-6-tert-octylamino-s-triazine and 4,4'-hexamethylenebis(amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis-(amino-2,2,6,6-tetramethylpiperidine) and 1,2-dibromoethane, tetrakis(2,2, 6,6-tetramethylpiperidin-4-yl) 1,2,3,4-butanetetracarboxylate, tetrakis(1,2,2,6,6-pentamethylpiperidin-4-yl) 1,2,3,4-butanetetracarboxylate, polycondensation product of 2,4-dichloro-6-morpholino-s-triazine and 4,4'-hexamethylenebis(amino-2,2,6,6-tetramethylpiperidine), N,N',N'',N'''-tetrakis[ (4,6-bis(butyl-2,2,6, 6-tetramethylpipefidin-4- yl)-amino-s-triazin- 2-yl]-1,10-diamino-4,7-diazadecane, mixed [2,2,6,6-tetramethylpiperidin- 4-yl/β,β,β',β'-tetramethyl-3,9-(2,4,8, 10-tetraoxaspiro[5.5]-undecane) diethyl] 1,2,3,4-butanetetracarboxylate, mixed [1,2,2,6,6-pentamethylpiperidin-4-yl/β,β,β',β'-tetramethyl- 3,9-(2,4,8, 10-tetraoxaspiro[ 5.5]undecane)diethyl] 1,2,3,4-butanetetracarboxylate, octamethylene bis(2,2,6,6-tetramethylpiperidin-4-carboxylate), 4,4'-ethylenebis(2,2,6, 6-tetra-methylpiperazin- 3-one) and bis(1-octyloxy-2,2,6,6-tetramethylpiperidin-4-yl) sebacate.

A most preferred hindered amine compound is bis(2,2,6, 6-tetramethylpiperidin-4-yl) sebacate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis(amino-2,2,6,6-tetramethylpiperidine), N,N',N'',N'''-tetrakis[( 4,6-bis(butyl-(2,2,6,6-tetramethyl-piperidin-4-yl)amino)-s-triazine-2-yl] -1,10-diamino-4,7-diazadecane or bis(1-octyloxy-2,2,6,6-tetramethylpiperidin-4-yl) sebacate.

The following examples are presented for the purpose of illustration only and are not to be construed to limit the scope or nature of the instant invention in any manner whatsoever.

EXAMPLE 1

High molecular weight, high density polyethylene (density 0.946) containing 0.04% by weight of neopentanetetrayl tetrakis(3,5-di-tert-butyl-4-hydroxyhydrocinnamate), 0.06% by weight of tris(2,4-di-tert-butylphenyl) phosphite, 0.1% by weight of carbon black and 1.0% or 2.0% by weight of bis(1,1,2,2-tetrahydroperfluoro-$C_6$–$C_{20}$alkyl) disulfide are homogeneously mixed. The resultant mixture is extruded in a single pass in a single screw extruder at a maximum of 450°–475° F. and 60 rpm, then pelletized and compression molded in a press with a surface temperature of 450° F. to coupons of 10 mm and 18 $cm^2$ surface area.

The films are tested for fuel permeation resistance with the use of Thwing-Albert Vapometer cups as specified in ASTM E96-66. Each vapometer cup is filled with 100 ml of fuel (specific gravity=0.752 g/ml). The cup is weighed after assembly and inverted so the fuel is in contact with the coupon. If permeation occurs, fuel is lost through the coupon and there is a loss in weight of the cup recorded. Testing is conducted at room temperature and the cups are weighed daily for a period of 26 days to note any changes in weight. The cups are run in duplicate and the results averaged. The results are given in the table below.

| Fluorochemical % by wt | Percent Weight Loss |
|---|---|
| none | 0.76 |
| 1.0 | 0.06 |
| 2.0 | 0.06 |

There is a perceptible weight loss in the control run. This is to be equated with severe permeation of the polyethylene by the fuel in the absence of the fluorochemical component. However, in the two formulations containing said fluorochemical component, there is a significant decrease in weight loss according to the instant invention. These data suggest that, once an effective amount of fluorochemical is present, additional fluorochemical is not needed to obtain the desired barrier effect.

As indicated by the significant decrease in percent weight loss observed in the table above, the plaques treated in accordance with the present invention exhibit greatly improved hydrocarbon permeation resistance.

EXAMPLE 2–5

In accordance with the procedure described in Example 1, other fluorochemicals and/or fluoropolymers can be incorporated into an organic polymer to improve the barrier resistance thereof.

| Example | Barrier Compound |
|---|---|
| 2 | 2,2-bis(1,1,2,2-tetrahydro-$C_6$—$C_{18}$-perfluoroalkyl-thiomethyl)-1,3-propanediol |
| 3 | tris(1,1,2,2-tetrahydro-$C_6$—$C_{18}$-perfluoroalkyl-ethyl) citrate |
| 4 | 2,2-bis[[($C_6$—$C_{18}$-perfluoroalkyl-2-propenyl)oxy]-methyl]-1-butanol |
| 5 | 3-[$C_6$—$C_{18}$perfluoroalkyl-2-propenyl)oxy]-2,2-bis-[[$C_6$—$C_{18}$perlfuoroalkyl-2-propenyl)oxy]methyl]-1-propanol. |

What is claimed is:

1. A film or a molded article, having enhanced barrier properties, which film or molded article comprises
    (a) an organic polymer, and
    (b) an effective amount, sufficient to provide enhanced barrier properties to said organic polymer, of a fluorochemical selected from the group consisting of ($R_fCH_2CH_2S)_2$, ($R_fCH_2CH_2SCH_2)_2C(CH_2OH)_2$, tris(1,1,2,2-tetrahydro-$C_6$–$C_{18}$-perfluoroalkylethyl) citrate, 2,2-bis-[[($C_6$–$C_{18}$-perfluoroalkyl-2-propenyl)oxy]methyl]-1-butanol or 3-[$C_6$–$C_{18}$-perfluoroalkyl-2-propenyl)oxy]-2,2-bis-[[$C_6$∝$C_{18}$-perfluoroalkyl-2-propenyl)oxy]methyl]-1-propanol, wherein said fluorochemical contains greater than 40% fluorine by weight and exhibits less than 20% weight loss at 165° C., as measured by thermogravimetric analysis (TGA) at 20° C./minute in air.

2. A film or a molded article according to claim 1, wherein the organic polymer is a synthetic polymer.

3. A film or a molded article according to claim 2, wherein the synthetic polymer is a polyolefin.

4. A film or a molded article according to claim 3, wherein the polyolefin is polypropylene.

5. A film or a molded article according to claim 1, wherein the fluorochemical contains a terminally fluorinated chain of 6 to 16 carbons.

6. A film or a molded article according to claim 1, wherein the fluorochemical is ($R_fCH_2S)_2$ or ($R_fCH_2CH_2SCH_2)_2C(CH_2OH)_2$.

7. A film or a molded article according to claim 6, wherein the fluorochemical is ($R_fCH_2CH_2SCH_2)_2C(CH_2OH)_2$.

8. A film or a molded article according to claim 1, wherein the film or molded article additionally contains a phenolic antioxidant, a hindered amine stabilizer or a mixture thereof.

9. A process for improving the barrier properties of a film or a molded article containing an organic polymer, which process comprises the steps of
    (a) incorporating into the organic polymer an effective amount, sufficient to provide enhanced barrier properties to said organic polymer, of a fluorochemical selected from the group consisting of ($R_fCH_2CH_2S)_2$, ($R_fCH_2CH_2SCH_2)_2C(CH_2OH)_2$, tris( 1,1,2,2-tetrahydro-$C_6$–$C_{18}$-perfluoroalkylethyl) citrate, 2,2-bis[ [($C_6$–$C_{18}$-perfluoroalkyl-2-propenyl)oxy]methyl]-1-butanol or 3-[$C_6$–$C_{18}$-perfluoroalkyl-2-propenyl)oxy]-2,2-bis-[[$C_6$–$C_{18}$-perfluoroalkyl-2 -oxy]methyl]-1-propanol, wherein said fluorochemical contains greater than 40% fluorine by weight and exhibits less than 20% weight loss at 165° C., as measured by thermogravimetric analysis (TGA) at 20° C./minute in air; and
    (b) subsequently producing a film or a molded article therefrom.

10. A process according to claim 9, wherein the organic polymer is a synthetic polymer.

11. A process according to claim 10, wherein the synthetic polymer is a polyolefin.

12. A process according to claim 11, wherein the polyolefin is polypropylene.

13. A process according to claim 9, wherein ($R_fCH_2CH_2S)_2$ or ($R_fCH_2CH_2SCH_2)_2C(CH_2OH)_2$ is incorporated into the organic polymer.

14. A process according to claim 13, wherein ($R_fCH_2CH_2SCH_2)_2C(CH_2OH)_2$ is incorporated into the organic polymer.

15. A process according to claim 9 further comprising the step of adding a phenolic antioxidant, a hindered amine stabilizer or a mixture thereof, before producing the film or molded article.

* * * * *